March 31, 1970     M. DVIRKA     3,503,348
INCINERATOR
Filed Aug. 30, 1968
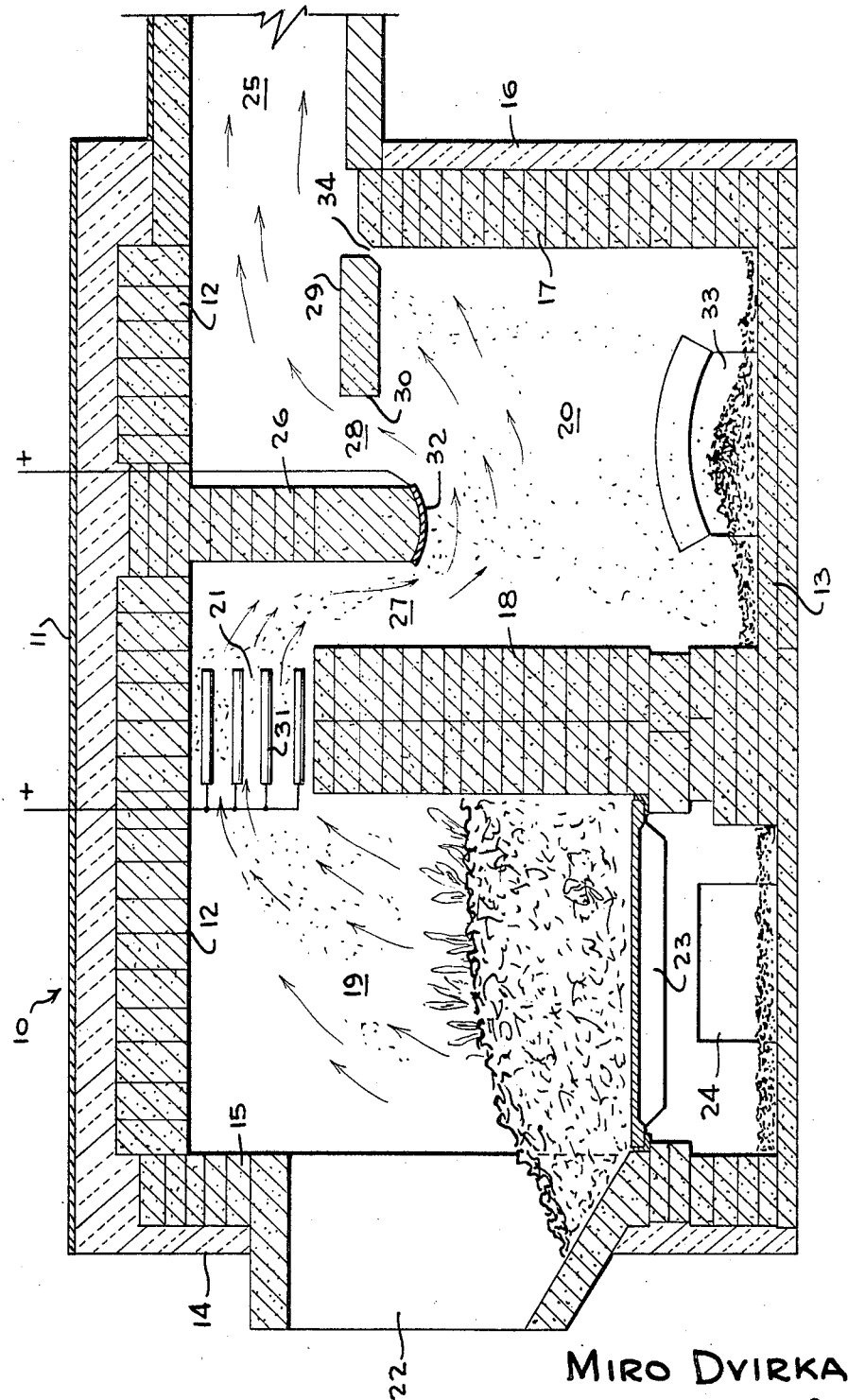
INVENTOR
MIRO DVIRKA
BY Mason, Fenwick & Lawrence
ATTORNEYS

United States Patent Office 3,503,348
Patented Mar. 31, 1970

3,503,348
INCINERATOR
Miro Dvirka, Long Island City, N.Y., assignor to Hagan Industries, Incorporated, Corona, N.Y., a corporation of New York
Filed Aug. 30, 1968, Ser. No. 756,531
Int. Cl. F23g 3/00
U.S. Cl. 110—8
10 Claims

ABSTRACT OF THE DISCLOSURE

An incinerator comprising a combustion chamber, a settling chamber, a flue, passageways interconnecting the combustion chamber and flue with the settling chamber being disposed relative to each other whereby combustion gases passing through the settling chamber describe a curved path about a center of curvature disposed between the passageways, the outlet passageway of the settling chamber having an inlet disposed sufficiently adjacent the center of curvature whereby fly ash carried with the gases passing through the settling chamber migrate along involute paths, a first electrical means for imparting an electrical bias to the fly ash entrained in the combustion gasses introduced into the settling chamber and a second electrical means having the same electrical bias disposed adjacent the center of curvature of the path of combustion gases for generating an electric field for repelling the fly ash carried with the combustion gases through the settling chamber whereby the centrifugal forces and the repelling forces of the electrical field cooperate to precipitate the fly ash entrained in the combustion gas traversing the settling chamber.

---

This invention relates to an incinerator and more particularly to an incinerator having novel structure for separating fly ash from the combustion gases thereof before the gases are discharged through the flue of the incinerator into the atmosphere.

In many conventional large capacity incinerators such as commercial, industrial and municipal incinerators, the burning of refuse often is incomplete, resulting in the production of a considerable amount of fly ash which is carried off by the combustion gases. Usually, the fly ash is carried by the combustion gases through the flue of the incinerator and discharged into the atmosphere, thus causing pollution of the atmosphere.

Various types of devices have been developed and utilized in the prior art to remove fly ash from the combustion gases before the gases are discharged into the atmosphere. In most commercial incinerators, fly ash is separated from the combustion gases by passing such gases through a tortuous discharge path including several bends. The repeated change of direction of the gases causes the fly ash to separate from the main stream of the combustion gases and settle to the bottom of various chambers from where it is removed. Such devices are most economical to construct and operate, in that they do not require any operational components which would increase the cost of operation and maintenance. It has been found, however, that although such separation devices are satisfactory in separating larger fly ash particles, i.e., particles larger than 40 microns, which flow at a relatively low velocity, such devices have not been satisfactory in separating smaller fly ash particles, i.e., smaller than 40 microns. It thus has been found desirable to develop an incinerator having a fly ash separator which will not only remove comparatively large particles of fly ash, but also fly ash particles smaller than 40 microns.

It, therefore, is the principal object of this invention to provide an improved incinerator.

Another object of the present invention is to provide an improved incinerator capable of removing fly ash from the gases emanating from the combustion chamber of the incinerator economically.

A further object of the invention is to provide an improved incinerator having a large capacity suitable for commercial, industrial and municipal purposes which is adapted to remove fly ash from the combustion gases economically.

It is a further object of the present invention to provide an improved incinerator which will produce a minimum of air pollution relative to comparable conventional incinerators.

Another object of the present invention is to provide an improved incinerator which is effective in removing fly ash particles smaller than 40 microns in size.

A further object of the present invention is to provide a novel structure for separating fly ash from the combustion gases in an incinerator before the gases are discharged through the flue thereof into the atmosphere.

A still further object of the present invention is to provide in an incinerator a novel structure for separating fly ash from the combustion gases thereof, which is comparatively simple in structure, inexpensive to construct and economical to operate.

Other objects and advantages of the present invention will become more apparent to those persons skilled in the art, from the following description taken in conjunction with the accompanying drawing, wherein the single view is a vertical cross-sectional view of an embodiment of the invention.

In accordance with the broad aspects of the present invention, there is provided an incinerator generally including a combustion chamber, a settling chamber, a flue and passageways interconnecting the combustion chamber and the flue with the settling chamber which are disposed relative to each other whereby combustion gases passing through the settling chamber describe a curved path about a center of curvature disposed between the passageways, the inlet of the outlet passageway of the settling chamber being disposed sufficiently adjacent the center of curvature whereby the solid particles of the gases passing through the settling chamber migrate along involute paths under the influence of centrifugal forces, a first electrical means for imparting an electrical bias to the solid particles of the combustion gases introduced into the settling chamber through the inlet passageway and a second electrical means having the same electrical bias disposed adjacent the center of curvature of the path of combustion gases for generating an electric field for repelling the solid particles carried with the combustion gases through the settling chamber whereby the centrifugal forces and the repelling forces of the electrical field generated by the second electrical means cooperate to precipitate the solid particles carried by the combustion gases traversing the settling chamber. In the preferred embodiment of the invention, the inlet and outlet passageways of the settling chamber are disposed vertically so that the centrifugal forces, gravitational forces and the repelling forces of the electrical field generated by the second electrical means cooperate to deflect fly ash particles entrained in the stream of combustion gases, including fly ash particles smaller than 40 microns in size, causing them to precipitate and accumulate on the bottom of the settling chamber. In addition, the first electrical means preferably consists of at least one electrode disposed in a passageway interconnecting the combustion chamber and the settling chamber, which generates an electric field of either a positive or negative charge and the second electrical means consists of an electrode mounted on the lower end of a depending wall separating the inlet and outlet passageways of the settling chamber which generates an electric field having the same charge as the first electrical means.

Referring to the drawing, there is illustrated an embodiment of the invention. The embodiment includes a housing structure 10 having an upper wall 11 lined with fire brick 12, a lower wall 13, a front end wall 14 lined on the interior side with fire brick 15, a rear end wall 16 lined on the interior side with fire brick 17, and a pair of side walls also lined on the interior sides with fire brick. Disposed within the housing structure is a partition wall 18 consisting of fire brick which is spaced from the front end wall 14 and the rear end wall 16, providing a combustion chamber 19 and a settling chamber 20. The upper end of the partition wall 18 terminates below the lower side of the upper wall 11 to provide a horizontal passageway 21. The front end wall 14 is provided with a charging chute 22 communicating with the combustion chamber 19 through which refuse may be charged into the combustion camber onto a grate 23 mounted in the lower end of the combustion chamber and spaced from the lower wall 13. An opening 24 is provided in one of the side walls below the grate 23 for removing ash deposited in the combustion chamber below the grate 23. The rear end wall 16 also is provided at its upper end with a horizontally disposed flue section 25.

Depending from the upper wall 11 and extending into the settling chamber 20 is a curtain wall 26. The lower end of the curtain wall projects below the upper level of the partition wall 18 and is spaced from the lower wall 13. In addition, the curtain wall 26 is spaced from the partition wall 18 and the rear end wall 16, to provide a first vertical passageway 27 and a second vertical passage way 28. The vertical passageway 27 intercommunicates the horizontal passageway 21 and the settling chamber 20, and the vertical passageway 28 intercommunicates the settling chamber 20 with the flue 25. It thus will be seen that the combustion gases emanating from the burning refuse on the grate 23 in the combustion chamber will rise and pass through the horizontal passageway 21, downwardly through the vertical passage way 27, around the lower end of the curtain wall 26 in the settling chamber 20, describing a curved path, upwardly through the vertical passageway 28 and horizontally through the flue 25 to be discharged into the atmosphere.

Mounted on the side walls, and disposed in the vertical passageway 28 is a baffle member 29 having the front end 30 thereof spaced from the curtain wall 24 to provide a restricted passageway between the baffle member and the curtain wall. The lower end of the baffle member 29 is elevated relative to the lower end of the curtain wall 26, and the cross-sectional areas of the vertical passageway 27 and the restricted passageway between the baffle and the curtain wall preferably are substantially equal.

Mounted in the horizontal passageway 21 is a plurality of electrodes 31 which lie in the path of the main stream of combustion gases emanating from the combustion chamber and passing into the settling chamber through the vertical passageway 27. The electrodes 31 are connected to an electrical supply, so that a potential may be impressed upon the electrodes to cause them to generate an electrical field of either a positive or negative bias in the horizontal chamber 21. It thus will be seen that fly ash particles carried with the main stream of combustion gases emanating from the combustion chamber and passing through the horizontal passageway 21 will pass through the electric field produced by the electrodes 31 and will be biased either with a positive or negative electrical charge.

An electrode 32 in the form of a curved plate is mounted on the lower end of the curtain wall 26 adjacent the center of curvature of the path of combustion gases traversing through the settling chamber. The electrode 32 is connected to an electrical supply and is biased with the same charge as the electrodes 31. The electrode further is operative to generate an electrical field in the normal path of the gases traversing through the settling chamber, being biased similarly to the electrical field produced in the horizontal passageway 21 by the electrodes 31.

In the operation of the embodiment illustrated in the drawing, when refuse is burned in the combustion chamber 19, a certain amount of fly ash will become entrained in the combustion gases emanating from the combustion chamber and will flow through the passageways 21 and 27, around the lower end of the curtain wall 26 in the settling chamber and adjacent the electrode 32, and upwardly through the passageway 28 into the flue 25, wherefrom the gases are discharged into the atmosphere. As the fly ash particles entrained in the combustion gases pass through the electrical field produced by the electrodes 31 in the horizontal passageway 21, they will become positively charged as a result of the positive potential impessed upon the electrodes, and will be caused to flow around the lower end of the curtain wall 26 into a positively biased electrical field generated by the electrode 32. As the combustion gases flow around the lower end of the curtain wall 26 and through the positively biased electrical field produced by the electrode 32, the fly ash particles will be subjected to a combination of gravitational forces, centrifugal forces, and the repelling forces of the electrical field having the same electrical bias as the particles, which will cause such particles to deflect downwardly following involute paths. The fly ash particles thus deflected eventually will impinge upon the rear end wall 16 and will fall to the bottom of the settling chamber. Periodically, such fly ash particles are removed from the settling chamber through an opening 33.

The large size fly ash particles traversing the settling chamber around the lower end of the curtain wall 26 normally will be flowing at a low velocity, so that the gravitational and centrifugal forces acting on such particles normally would be sufficient to deflect them downwardly along involute paths and cause them to precipitate. The repelling force of the electrical field produced by the electrode 32 will provide an additional impetus in deflecting the large size particles, thus assuring their deflection and separation from the main stream of gases passing through the settling chamber into the flue to be discharged into the atmosphere. The electrical field produced by the electrode 32 is particularly effective, however, in deflecting the smaller fly ash particles normally tending to flow at a higher velocity with the main stream of combustion gases. The gravitational and centrifugal forces acting on such small particles normally would not be sufficiently effective in deflecting the particles to separate them from the main stream of combustion gases traversing the settling chamber. However, the repelling forces of the electrical field produced by the electrode 32 will be sufficient to deflect such smaller fly ash particles along with the larger fly ash particles and cause them to precipitate in the settling chamber. Accordingly, the gases passing into the flue and discharged into the atmosphere will be relatively free of undesirable pollutants.

The fly ash particles deflected from the main stream of gases traversing through the settling chamber are caused to follow involute paths of increased radii which impinge upon either the rear end wall structure or the baffle member 29. The flow of gases obstructed by the baffle member 29 normally would develop a high pressure zone thereunder, which would tend to disturb the separation process as previously described. This high pressure zone which tends to develop in the settling chamber below the baffle member 29 is eliminated by means of a relief passageway 34 which intercommunicates the high pressure zone of the settling chamber 20 and the flue 25. For efficient operation of the incinerator, the cross-sectional area of the relief passageway 34 is no greater than about five percent of the cross-sectional area of the flue 25.

The housing structure 10, the partition wall 18 and the curtain wall 26 can be constructed of any suitable material, although it is preferred that the housing structure be lined with a suitable fire brick and the partition and curtain walls also be constructed of a fire resistant material. It further will be seen that any suitable means can be used to charge the fly ash particles entrained in the combustion gases emanating from the combustion chamber and repelling such particles in the settling chamber. It is important, however, that the electrode provided in the settling chamber for producing an electric field to provide repelling forces must be positioned so that the repelling forces of the electrical field cooperate with the gravitational and centrifugal forces acting on the fly ash particles entrained in the combustion chambers as they traverse through the settling chamber so that maximum forces are applied to such particles to cause them to deflect and separate from the main stream of gases flowing into the flue and discharged into the atmosphere.

I claim:

1. In an incinerator having a combustion chamber and a flue, a structure for separating solid particles from combustion gases emanating from said combustion chamber comprising a settling chamber including an inlet passageway and an outlet passageway, said inlet passageway communicating with said combustion chamber, and said outlet passageway communicating with said flue wherein said inlet passageway, said settling chamber and said outlet passageway provide a continuous passageway for combustion gases emanating from said combustion chamber and exhausted through said flue, said inlet and outlet passageways being disposed relative to each other whereby combustion gases passing through said settling chamber describe a curved path about a center of curvature disposed between said passageways, said outlet passageway having an inlet disposed sufficiently adjacent said center of curvature whereby said solid particles of said combustion gases passing through said settling chamber migrate along involute paths under the influence of the centrifugal forces resulting from the motion of said combustion gases, a first electrical means for imparting an electrical bias to said solid particles of said combustion gases introduced into said settling chamber through said inlet passageway and a second electrical means having the same electrical bias disposed adjacent said center of curvature for generating an electrical field for repelling said solid particles carried with said combustion gases through said settling chamber whereby said centrifugal forces and the repelling forces of said electrical field cooperate to precipitate said solid particles of said combustion gas traversing said settling chamber.

2. In an incinerator having a combustion chamber and a flue, a structure for separating solid particles from combustion gases emanating from said combustion chamber according to claim 1, wherein said inlet and outlet passageways are vertical whereby centrifugal forces, gravitational forces and the repelling forces of said electrical field generated by said second electrical means cooperate to precipitate said solid particles carried by said combustion gases traversing said settling chamber.

3. In an incinerator having a combustion chamber and a flue, a structure for separating solid particles from combustion gases emanating from said combustion chamber according to claim 1, wherein said first electrical means comprises at least one electrode generating an electrical field in a passageway communicating with said inlet passageway through which the combustion gases emanating from said combustion chamber pass.

4. In an incinerator having a combustion chamber and a flue, a structure for separating solid particles from combustion gases emanating from said combustion chamber according to claim 1, including a depending wall separating said inlet and outlet passageways and wherein said second electrical means for generating an electrical field is mounted on the lower end of said depending wall.

5. An incinerator comprising a combustion chamber, a settling chamber, a flue, said settling chamber having an upwardly extending vertical inlet passageway communicating with said combustion chamber and an upwardly extending vertical outlet passageway communicating with said flue wherein said inlet passageway, said settling chamber and said outlet passageway provide a continuous passageway for combustion gases emanating from said combustion chamber and exhausted through said flue, said inlet and outlet passageways being spaced apart a predetermined distance whereby combustion gases passing through said settling chamber describe a curved path about a center of curvature disposed between said passageways, said outlet passageway having an inlet disposed sufficiently adjacent said center of curvature whereby said solid particles of said combustion gases passing through said settling chamber migrate along involute paths under the influence of the centrifugal field produced by said curved path of said combustion gases, a first electrical means for imparting an electrical bias to said solid particles of said combustion gases introduced into said settling chamber through said inlet passageways and a second electrical means having the same electrical bias disposed adjacent said center of curvature for generating an electrical field for repelling said solid particles carried with said combustion gases through said settling chamber whereby centrifugal forces, gravitational forces and the repelling forces of said electrical field generated by said second electrical means cooperate to precipitate said solid particles carried by said combustion gases traversing said settling chamber.

6. An incinerator according to claim 5, wherein said first electrical means comprises at least one electrode generating an electrical field in a passageway through which the combustion gases emanating from said combustion chamber pass.

7. An incinerator according to claim 5, including a depending wall separating said inlet and outlet passageways and wherein said second electrical means for generating an electrical field is mounted on the lower end of said depending wall.

8. An incinerator comprising a housing structure including an end wall, a rear end wall, upper and lower walls and side walls, said housing structure having a partition wall therein spaced from said front end wall providing a combustion chamber between said partition wall and said front end wall, and a settling chamber between said partition wall and said rear end wall, said housing structure having means for charging matter into said combustion chamber, the upper end of said partition wall terminating below said upper wall to provide a substantially horizontal passageway, a curtain wall depending from said upper wall between said partition wall and said rear end wall to provide a first vertical passageway intercommunicating with said horizontal passageway and said settling chamber, and a second vertical passageway communicating with said settling chamber, a baffle member disposed in said second vertical passageway having the front end thereof spaced from said curtain wall to provide a restricted opening therebetween, said housing structure having a flue communicating with said second vertical passageway, a first electrical means for imparting an electrical bias to said solid particles of combustion gases introduced into said settling chamber through said first vertical passageway and second electrical means having the same electrical bias disposed adjacent said center of curvature for generating an electrical field for repelling said solid particles carried with said combustion gases through said settling chamber whereby centrifugal forces, gravitational forces and the repelling forces of said electrical field generated by said second electrical means cooperate to precipitate said solid particles carried by said combustion gases traversing said settling chamber.

9. An incinerator according to claim 8, wherein said first electrical means is disposed in said horizontal passageway intercommunicating said combustion chamber and said first vertical passageway.

10. An incinerator according to claim 8, wherein said second electrical means is mounted on the lower end of said curtain wall.

References Cited

UNITED STATES PATENTS

| | | | |
|---|---|---|---|
| 1,755,027 | 4/1930 | Saha | 110—8 |
| 2,800,193 | 7/1957 | Beaver | 55—149 |
| 3,212,856 | 10/1965 | Smith | 55—149 |
| 3,259,083 | 7/1966 | Evans | 110—8 |

EDWARD G. FAVORS, Primary Examiner

U.S. Cl. X.R.

55—2, 101